United States Patent [19]

Noero

[11] Patent Number: 5,783,374
[45] Date of Patent: Jul. 21, 1998

[54] PROCESS FOR PROCESSING PHOTOGRAPHIC BATHS FROM COLOR PROCESSES

[76] Inventor: Roger Noero, Graf-Eberstein-Str. 6, D-76199 Karlsruhe, Germany

[21] Appl. No.: 857,676

[22] Filed: May 16, 1997

[30] Foreign Application Priority Data

May 16, 1996 [DE] Germany .................. 196 19 828.3

[51] Int. Cl.$^6$ ..................................................... G03C 7/44
[52] U.S. Cl. ........................... 430/400; 430/398; 430/399
[58] Field of Search .................................. 430/398, 399, 430/400

[56] References Cited

U.S. PATENT DOCUMENTS

| | | | |
|---|---|---|---|
| 3,700,450 | 10/1972 | Cooley | 430/400 |
| 3,767,401 | 10/1973 | Newman et al. | 430/400 |
| 4,013,527 | 3/1977 | Idota et al. | 430/400 |
| 4,038,079 | 7/1977 | Meckl et al. | 430/400 |
| 4,128,464 | 12/1978 | Idota | 430/400 |
| 4,186,007 | 1/1980 | Meckl et al. | 430/399 |
| 4,204,930 | 5/1980 | Ono et al. | 430/400 |
| 4,217,188 | 8/1980 | Ono | 430/399 |
| 4,256,559 | 3/1981 | Ono et al. | 430/400 |
| 4,313,808 | 2/1982 | Idemoto et al. | 430/399 |
| 4,680,123 | 7/1987 | Wermicke et al. | 430/399 |
| 5,055,382 | 10/1991 | Long et al. | 430/400 |
| 5,162,106 | 11/1992 | Kunda et al. | 430/400 |
| 5,173,157 | 12/1992 | Nevels | |

Primary Examiner—Hoa Van Le
Attorney, Agent, or Firm—Antonelli, Terry, Stout & Kraus, LLP

[57] ABSTRACT

A process for the processing of spent photographic baths from color processes, namely bleaching or fixing baths with a preponderant content of amonium-Fe-EDTA (ethylene diamine tetraacetic acid) as the sequestering agent, fixing baths with a preponderant content of thiosulphates, particularly ammonium thiosulphate and optionally sodium thiosulphate, and developing baths with a preponderant content of sulfate, particularly sodium sulfite is proposed, which is characterized in that, following the deposition of the silver contained in the baths, the multipart starting solution is adjusted to a pH of approximately 13.5 to 14 using NaOH and the Fe(OH)$_3$ obtained after Fe complex decomposition is separated, the remaining, first intermediate solution is adjusted to a pH of 10 by adding acid and the resulting ammonia is separated, the remaining, second intermediate solution is brought to a pH of approximately 0.5 with concentrated HCl, the thiosulphates being decomposed into elementary sulphur and sulphurous acid and the sulphur is separated, the remaining, third intermediate solution is raised to a pH of approximately 1.5 with inorganic liquor and the crystallizing out EDTA is drawn off, the residual solution mixed with developing baths is raised to pH-3 and the sulfate contained therein is transformed into SO$_2$, which is separated.

10 Claims, No Drawings

PROCESS FOR PROCESSING PHOTOGRAPHIC BATHS FROM COLOR PROCESSES

FIELD OF THE INVENTION

The invention relates to a process for processing respect or exhaust photographic baths from colour processes, namely bleaching or bleaching-fixing baths with a preponderant content of ammonium-Fe-EDTA (ethylene diamine tetraacetic acid) as the sequestering agent, fixing baths with a preponderant content of thiosulphates, particularly ammonium thiosulphate and optionally sodium thiosulphate, and developing baths with a preponderant content of sulfate, particularly sodium sulfate.

BACKGROUND OF THE INVENTION

The sequestering agent used in bleaching and bleaching-fixing baths for colour photographic processes are processes are ecologically the most problematical component in photographic baths. Up to quite recently hexacyanoferrate are mainly used as the sequestering agent, but as a result of the risk of releasing cyanides, has been replaced by other sequestering agents and more particularly by ammonium-Fe-complexes of ethylene diamine tetraacetic acid (EDTA). These sequestering agents firstly have the advantage of no or negligible toxicity. In addition, they can easily be processed in the bleaching bath by serration. The divalent iron obtained during the bleaching process is reoxidized by atmosphere oxygen. The stability of the Fe-EDTA complex is extremely positive. However, this stability is disadvantageous in the processing of baths, because ammonium-Fe-EDTA is non-biodegradable, so that it cannot be led off into waste water, but most instead by treated as hazardous waste.

The resulting problems and costs are made particularly clear by the fact that bleaching and bleaching-fixing baths have an EDTA concentration up to 45 g/l. In addition, EDTA is also frequently used as a line protection agent in black and white processes and is then present in a concentration of 1 to 4 g/l in developing baths.

Only ozone treatment has been used up to now for the processing of Fe-EDTA complexes. However, only approximately 50% can be decomposed at an acceptable cost. In addition, biodegradation by natural populations is extremely slow, which prevents may leading off into the waste water system (W. Baumann, "Potochemikalien", second addition, Springer Verlag).

Bleaching-fixing baths, as well as fixing baths without any bleaching action and namely also those for black and white photographs, contain large ammonium thiosulphate and optionally also sodium thiosulphate quantities, apart from other components, up to 100 g of sulphites per litre, generally in the form of sodium sulfite, which serves as an oxygen acceptor and is only partly oxidized during the photographic process 40 to 50 g/l thereof still occur in spent baths.

The problem of the invention is to propose a process with whcih the aforementioned photographic baths from colour processes can be processed in such a way that the resulting products are reusable, i.e. can be returned to technical or industrial processes, and the residual liquid obtained only contains environmentally compatible substances, which allow feeding into the waste water system.

SUMMARY OF THE INVENTION

According to the invention this problem is solved in that following the deposition of the silver contained in the baths in a conventional process, the multipart starting solution is adjusted to a pH of approximately 13.5 to 14 by means of XaOH and the $Fe(OH)_3$ obtained through the decomposition of the Fe complex is separated, the remaining, first intermediate solution is adjusted to pH-10 by adding acid and the resulting ammonia is separated, the remaining, second intermediate solution is brought to a pH of approximately 0.5 with concentrated HCl, the thiosulphates decomposing into sulphur and sulphurous acid and the sulphur is separated, the remaining, third intermediate solution is raised to a pH of approximately 1.5 with inorganic liquor and the crystallized out EDTA is drawn off, the residual solution is mixed with developing baths, raised to a pH of 3 and the sulfite contained therein is transformed into $SO_2$ and separated.

The ammonia obtained in the second stage can be drawn off in vacuo and either reused as pure ammonia gas or can be converted into ammonium salts by introduction into water. The sulphur obtained in the third stage can either be reused as elementary sulphur or as a $SO_2$ source.

The EDTA crystallized out in the fourth stage, optionally after further purification, can again be used for the preparation of the sequestering agent.

The $SO_2$ obtained in the final stage can again be supplied to industrial uses, e.g. liuquefied by condensation, transformed into sulphurous acid by introduction into water or used for the preparation of alkali hydrogen sulphites by introduction into aqueous hydroxide solutions or suspensions.

To the extend that the residual solution occurring in the final stage contains residual substances which are ecologically problematical, the residual solution is mixed with small amounts of hydrogen peroxide, e.g. in the range 10 ml/l, so that the residual substances, mainly residual sulfite and organic compounds are oxidized. If necessary, after oxidization, the residual solution can be adjusted with calcium hydroxide to the prescribed pH-value for introduction into waste water. The organic constituents are oxidized to such an extent that they are biodegradable. The alkali chlorides produced during the process are not problematical from a waste water disposal standpoint.

The $Fe(OH)_3$ sludge produced from the starting solution is preferably separated by sedimentation or filtration. The acid added to the first intermediate solution can be hydrochloric acid. However, in place of this it is also possible to add acid fixing baths, generally acetic acid fixing baths, or they can be supplemented by hydrochloric acid, in order to adjust the first intermediate solution to pH-10. The ammonia liberated following acid addition is preferably drawn off in vacuo.

The sulphur produced following HCl addition from the second intermediate solution is sedimented. It is appropriate to allow the intermediate solution to stand for a few hours, in order to ensure a complete sedimentation of the sulphur.

The inorganic liquor added to the third intermediate solution for raising the pH to 1.5 can be NaOH. Instead or or in additon thereto, it is possible to add spent developing baths, which generally contain NaOH and have a residual basicity after use. The crystallizing out to EDTA can be sided by slow stirring, optionally also by inoculation with germs.

The residual solution raised to pH-3 with developing baths is preferably heated in order to expel pure $SO_2$ from the $SO_2$-supersaturated solution, said $SO_2$ being sucked off and reused in the above described manner.

The process proposed by the invention allows the recovery of a considerable proportion of the valuable substances contained in colour photographic baths. They can in part be used in other industrial processes and in part for the preparation of photographic baths. After oxidation of residual substances and adjusting the pH-value, the residual liquid can be led off into the waste water system. The invention also permits the processing of the baths used in colour processes in a single, multistage process. With the process according to the invention it is also possible to process PDTA complexes (propane-diamine-N,N,N',N'-tetraacetic acid), which occasionally occur in bleaching baths.

I claim:

1. Process for processing spent photographic baths from color processes, namely bleaching or bleaching-fixing baths with a preponderant content of ammonium-Fe-EDTA (ethylene diamine tetraacetic acid) as the sequestering agent, fixing baths with a preponderant content of thiosulphates, particularly ammonium thiosulphate and optionally sodium thiosulphate, and developing baths with a preponderant content of sulfite, particularly sodium sulfate, characterized in that, following the deposition of the silver contained in the baths, the multipart starting solution is adjusted to a pH of approximately 13.5 to 14 using NaOH and the $Fe(OH)_3$ obtained through the decomposition of the Fe complex is separated, the remaining, first intermediate solution is adjusted to pH-10 by adding acid and the resulting ammonia separated, the remaining, second intermediate solution is brought to a pH of approximately 0.5 with concentrated HCl, the thiosulphates being decomposed into elementary sulphur and sulphurous acid and the sulphur is separated, the remaining, third, sulphurous acid intermediate solution is brought to a pH of approximately 1.5 with inorganic liquor and the crystallizing out EDTA is drawn off, the residual solution being mixed with developing baths, raised to pH-3 and the sulfate contained therein is transformed into $SO_2$, which is separated.

2. Process according to claim 1, characterized in that the residual solution is mixed with $H_2O_2$ for oxidizing the residual substances present.

3. Process according to claim 2, characterized in that the residual solution, following oxidation of the residual substances with $Ca(OH)_2$, is adjusted to the prescribed pH-value for introduction into the waste water system.

4. Process according to claim 1, characterized in that the $Fe(OH)_3$ sludge obtained from the starting solution is separated by sedimentation or filtration.

5. Process according to claim 1, characterized in that, to the first intermediate solution, acid fixing baths and/or hydrochloric acid are added as the acid.

6. Process according to claim 1 or 5, characterized in that, the ammonia liberated following acid addition is drawn off is vacuo.

7. Process according to claim 1, characterized in that the sulphur obtained from the second intermediate solution following HCl addition is sedimented and separated.

8. Process according to claim 1, characterized in that basic developing baths and/or NaOH are added as inorganic liquor to the third intermediate solution.

9. Process according to claim 1 or 8, characterized in that the third intermediate solution is slowly stirred and/or inoculated with germs for siding crystal formation.

10. Process according to claim 1, characterized in that the residual solution is heated with the added developing baths and the resulting $SO_2$ is sucked off.

* * * * *

UNITED STATES PATENT AND TRADEMARK OFFICE
CERTIFICATE OF CORRRECTION

PATENT NO. : 5,783,374
DATED : July 21, 1998
INVENTOR(S) : Roger Noero It is certified that error appears in the above-identified patent and that said Letters Patent is hereby corrected as shown below:

On the title page: item [56], insert the following;

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 5 | 0 | 5 | 2 | 2 09/94 | Fyson | | | |
| | | 4 | 7 | 5 | 5 | 4 | 5 | 3 07/88 | Kunda et al. | | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | | 4 | 4 | 1 | 7 | 9 | 3 | 3 11/95 | Germany | | | |
| | | | 3 | 4 | 4 | 0 | 8 | 9 | 4 06/86 | Germany | | | |
| | | | 4 | 0 | 2 | 5 | 8 | 9 | 5 02/92 | Germany | | | |
| | | | | | | | | | | | | | |

OTHER DOCUMENTS (Including Author, Title, Date, Pertinent Pages, Etc.)

Database WPI, Section CH, Week 9527 Derwent Publs. Ltd Class D15 An 95-203129 & JP 07 116 670 Ko ENG KK 9 May 1995

Database WPI, section CH, Week 7626 Derwent Publs. Ltd. Class D15 An 76-48533X XP002036615 & JP 51 052 666 May 10,1976

Patent Abstracts of Japan vol. 11, no. 317, (C-452) 15 Oct. 1987 & JP 62 103050 Hitachi Plant Eng & Constr Co. Ltd 13 May 1987

Signed and Sealed this

Twenty-sixth Day of October, 1999

*Attest:*

Q. TODD DICKINSON

*Attesting Officer*   Acting Commissioner of Patents and Trademarks